United States Patent
Sumner et al.

(10) Patent No.: US 11,335,051 B2
(45) Date of Patent: May 17, 2022

(54) PARAMETERIZED ANIMATION MODIFICATIONS

(71) Applicant: Disney Enterprises, Inc., Burbank, CA (US)

(72) Inventors: Robert W. Sumner, Zurich (CH); Alba Maria Rios Rodriguez, Zurich (CH); Maurizio Nitti, Duebendorf (CH); Mattia Ryffel, Bern (CH); Steven C. Poulakos, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days.

(21) Appl. No.: 16/815,540

(22) Filed: Mar. 11, 2020

(65) Prior Publication Data

US 2021/0125393 A1 Apr. 29, 2021

Related U.S. Application Data

(60) Provisional application No. 62/925,982, filed on Oct. 25, 2019.

(51) Int. Cl.
  *G06T 13/80* (2011.01)
  *G06T 13/40* (2011.01)
  *G06T 11/20* (2006.01)

(52) U.S. Cl.
  CPC ............ *G06T 13/80* (2013.01); *G06T 11/203* (2013.01); *G06T 13/40* (2013.01); *G06T 2213/08* (2013.01)

(58) Field of Classification Search
  None
  See application file for complete search history.

(56) References Cited

U.S. PATENT DOCUMENTS

| 9,734,618 B2 * | 8/2017 | Grossman ............... G06T 13/80 |
| 2020/0005532 A1 * | 1/2020 | Kovar ..................... G06T 13/20 |
| 2020/0135236 A1 * | 4/2020 | Chuang ................... G06T 13/40 |

OTHER PUBLICATIONS

Brenna D Argall, Sonia Chernova, Manuela Veloso, and Brett Browning. 2009. A survey of robot learning from demonstration. Robotics and autonomous systems 57, 5 (2009), 469-483.
Andreas Aristidou and Joan Lasenby. 2011. FABRIK: A fast, iterative solver for the Inverse Kinematics problem. Graphical Models 73, 5 (2011), 243-260.
Andreas Aristidou, Joan Lasenby, Yiorgos Chrysanthou, and Ariel Shamir. 2018. Inverse Kinematics Techniques in Computer Graphics: A Survey. In Computer Graphics Forum, vol. 37. Wiley Online Library, 35-58.
JA Bagnell, Joel Chestnutt, David M Bradley, and Nathan D Ratliff. 2007. Boosting structured prediction for imitation learning. In Advances in Neural Information Processing Systems. 1153-1160.

(Continued)

*Primary Examiner* — Tize Ma
(74) *Attorney, Agent, or Firm* — Patterson + Sheridan, LLP

(57) ABSTRACT

Techniques for animation are provided. A first trajectory for a first element in a first animation is determined. A first approximation is generated based on the first trajectory, and the first approximation is modified based on an updated state of the first element. The first trajectory is then refined based on the modified first approximation.

20 Claims, 7 Drawing Sheets

(56) References Cited

OTHER PUBLICATIONS

Alexander Bereznyak. 2016. IK Rig: Procedural Pose Animation. <https://www.gdcvault.com/play/1018058/AI-Postmortems-Assassin-s-Creedm> com/play/1018058/AI-Postmortems-Assassin-s-Creedm <https://www.gdcvault.com/play/1018058/AI-Postmortems-Assassin-s-Creedm>.
Joel Brown, Jean-Claude Latombe, and Kevin Montgomery. 2004. Real-time knot-tying simulation. The Visual Computer 20, 2-3 (2004), 165-179.
Byungkuk Choi, JP Lewis, Yeongho Seol, Seokpyo Hong, Haegwang Eom, Sunjin Jung, Junyong Noh, et al. 2016. SketchiMo: sketch-based motion editing for articulated characters. ACM Transactions on Graphics (TOG) 35, 4 (2016), 146.
Lee Dowsett and Geoff Harrower. 2015. Animation Bootcamp: UFC Animation System, https://www.gdcvault.com/play/1021794/Animation-Bootcamp-UFC-Animation.
Michael S Floater. 2008. On the deviation of a parametric cubic spline interpolant from its data polygon. Computer Aided Geometric Design 25, 3 (2008), 148-156.
Keith Grochow, Steven L Martin, Aaron Hertzmann, and Zoran Popovi?. 2004. Stylebased inverse kinematics. In ACM transactions on graphics (TOG), vol. 23. ACM, 522-531.
Martin Guay, Rémi Ronfard, Michael Gleicher, and Marie-Paule Cani. 2015. Space-time sketching of character animation. ACM Transactions on Graphics (TOG) 34, 4 (2015), 118.
Edmond SL Ho, Taku Komura, and Chiew-Lan Tai. 2010. Spatial relationship preserving character motion adaptation. In ACM Transactions on Graphics (TOG), vol. 29. ACM, 33.
Daniel Holden, Jun Saito, and Taku Komura. 2016. A deep learning framework for character motion synthesis and editing. ACM Transactions on Graphics (TOG) 35, 4 (2016), 138.
Eugene Hsu, Kari Pulli, and Jovan Popovi?. 2005. Style translation for human motion. In ACM Transactions on Graphics (TOG), vol. 24 ACM, 1082-1089.
Yazhou Huang and Marcelo Kallmann. 2010. Motion parameterization with inverse blending. In International Conference on Motion in Games. Springer, 242-253.
Ollie Johnston and Frank Thomas. 1981. The illusion of life: Disney animation. Disney Editions New York.
Manmyung Kim, Kyunglyul Hyun, Jongmin Kim, and Jehee Lee. 2009. Synchronized multi-character motion editing. ACM transactions on graphics (TOG) 28, 3 (2009), 79.
Lucas Kovar and Michael Gleicher. 2004. Automated extraction and parameterization of motions in large data sets. In ACM Transactions on Graphics (ToG), vol. 23. ACM, 559-568.
Lucas Kovar, Michael Gleicher, and Frederic Pighin. 2008. Motion graphs. In ACM SIGGRAPH 2008 classes. ACM, 51.
Aleissia Laidacker. 2013. AI Postmortems: Assassin's Creed III, XCOM: Enemy Unknown, and Warframe. https://www.gdcvault.com/play/1018058/AI-Postmortems-Assassin-s-Creedm.
C Karen Liu, Aaron Hertzmann, and Zoran Popovi. 2005. Learning physics-based motion style with nonlinear inverse optimization. In ACM Transactions on Graphics (TOG), vol. 24. ACM, 1071-1081.
Walter Maurel and Daniel Thalmann. 2000. Human shoulder modeling including scapulo-thoracic constraint and joint sinus cones. Computers & Graphics 24, 2 (2000), 203-218.

Jianyuan Min, Huajun Liu, and Jinxiang Chai. 2010. Synthesis and editing of personalized stylistic human motion. In Proceedings of the 2010 ACM SIGGRAPH symposium on Interactive 3D Graphics and Games. ACM, 39-46.
Monica N Nicolescu and Maja J Mataric. 2003. Natural methods for robot task learning: Instructive demonstrations, generalization and practice. In Proceedings of the second international joint conference on Autonomous agents and multiagent systems. ACM, 241-248.
Amir H Rabbani and Paul G Kry. 2016. PhysIK: Physically Plausible and Intuitive Keyframing.. In Graphics Interface. 153-161.
Nathan D Ratliff, J Andrew Bagnell, and Martin A Zinkevich. 2006. Maximum margin planning. In Proceedings of the 23rd international conference on Machine learning. ACM, 729-736.
Charles Rose, Michael F Cohen, and Bobby Bodenheimer. 1998. Verbs and adverbs: Multidimensional motion interpolation using radial basis functions. IEEE Computer Graphics and Applications 18, 5 (1998), 32-40.
Charles F Rose III, Peter-Pike J Sloan, and Michael F Cohen. 2001. Artist-directed inverse-kinematics using radial basis function interpolation. In Computer Graphics Forum, vol. 20. Wiley Online Library, 239-250.
Ari Shapiro, Yong Cao, and Petros Faloutsos. 2006. Style components. In Proceedings of Graphics Interface 2006. Canadian Information Processing Society, 33-39.
Ari Shapiro, Marcelo Kallmann, and Petros Faloutsos. 2007. Interactive motion correction and object manipulation. In Proceedings of the 2007 symposium on Interactive 3D graphics and games. ACM, 137-144.
Ari Shapiro and Sung-Hee Lee. 2011. Practical character physics for animators. IEEE computer graphics and applications 31, 4 (2011), 45-55.
Songqiao Tao and Yumeng Yang. 2017. Collision-free motion planning of a virtual arm based on the FABRIK algorithm. Robotica 35, 6 (2017), 1431-1450.
Luis Unzueta, Manuel Peinado, Ronan Boulic, and Angel Suescun. 2008. Full-body performance animation with sequential inverse kinematics. Graphical models 70, 5 (2008), 87-104.
Michael van Lent, John E Laird, et al. 2001. Learning procedural knowledge through observation. In K-CAP, vol. 1. 179-186.
L-CTWang and Chih-Cheng Chen. 1991. A combined optimization method for solving the inverse kinematics problems of mechanical manipulators. IEEE Transactions on Robotics and Automation 7, 4 (1991), 489-499.
Xiaolin Wei and Jinxiang Chai. 2011. Intuitive interactive human-character posing with millions of example poses. IEEE Computer Graphics and Applications 31, 4 (2011), 78-88.
Harold Whitaker and John Halas. 2013. Timing for animation. CRC Press.
Andrew Witkin and Zoran Popovic. 1995. Motion warping. In SIGGRAPH, vol. 95. 105-108.
Shihong Xia, Congyi Wang, Jinxiang Chai, and Jessica Hodgins. 2015. Realtime style transfer for unlabeled heterogeneous human motion. ACM Transactions on Graphics (TOG) 34, 4 (2015), 119.
Xiaosong Yang, Arun Somasekharan, and Jian J Zhang. 2006. Curve skeleton skinning for human and creature characters. Computer Animation and Virtual Worlds 17, 3-4 (2006), 281-292.
Andreas Aristidou, Qiong Zeng, Efstathios Stavrakis, KangKang Yin, Daniel Cohen-Or, Yiorgos Chrysanthou, and Baoquan Chen. 2017. Emotion control of unstructured dance movements. In Proceedings of the ACM SIGGRAPH/Eurographics Symposium on Computer Animation. ACM, 9.

* cited by examiner

PARAMETERIZED ANIMATION MODIFICATIONS

CROSS-REFERENCE TO RELATED APPLICATIONS

This application claims benefit of U.S. provisional patent application Ser. No. 62/925,982, filed Oct. 25, 2019. The aforementioned application is herein incorporated by reference in its entirety.

BACKGROUND

The present disclosure relates to animation, and more specifically, to parameterizing actions in order to improve the animation process.

Through subtle variations in motion, talented animators can bring digital characters to life. Expressive character animation gives digital characters identity, mood, and personality. However, creating this expressive motion is a challenging task. In order to achieve the quality results, animators most often utilize keyframing tools, which allow them to carefully craft and control all aspects of a character's movement. In this process, animators carefully construct the pose of digital characters at key points in the animation, which are then interpolated by the animation software. Generating these key poses, achieving the appropriate timing, and effectively incorporating the principles of animation is an entirely manual, time consuming, and costly process. Further, once the investment has been made to create an animation, no tools exist to reuse that investment on similar animation tasks. Typically, to modify the animation, the entire manual process must begin from scratch.

SUMMARY

According to some embodiments of the present disclosure, a method is provided. The method includes receiving a first animation comprising a plurality of elements, and identifying an updated state of a first element of the plurality of elements. The method further includes determining a first trajectory for the first element, based on the first animation. Additionally, the method includes generating a first approximation based on the first trajectory, and modifying the first approximation based on the updated state of the first element. The method then includes refining the first trajectory based on the modified first approximation.

According to some embodiments of the present disclosure, a non-transitory computer-readable medium is provided. The non-transitory computer-readable medium contains computer program code that, when executed by operation of one or more computer processors, performs an operation. The operation includes receiving a first animation comprising a plurality of elements, and identifying an updated state of a first element of the plurality of elements. The operation further includes determining a first trajectory for the first element, based on the first animation. Additionally, the operation includes generating a first approximation based on the first trajectory, and modifying the first approximation based on the updated state of the first element. The operation then includes refining the first trajectory based on the modified first approximation.

According to some embodiments of the present disclosure, a system is provided. The system includes one or more computer processors, and a memory containing a program which, when executed by the one or more computer processors, performs an operation. The operation includes receiving a first animation comprising a plurality of elements, and identifying an updated state of a first element of the plurality of elements. The operation further includes determining a first trajectory for the first element, based on the first animation. Additionally, the operation includes generating a first approximation based on the first trajectory, and modifying the first approximation based on the updated state of the first element. The operation then includes refining the first trajectory based on the modified first approximation.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
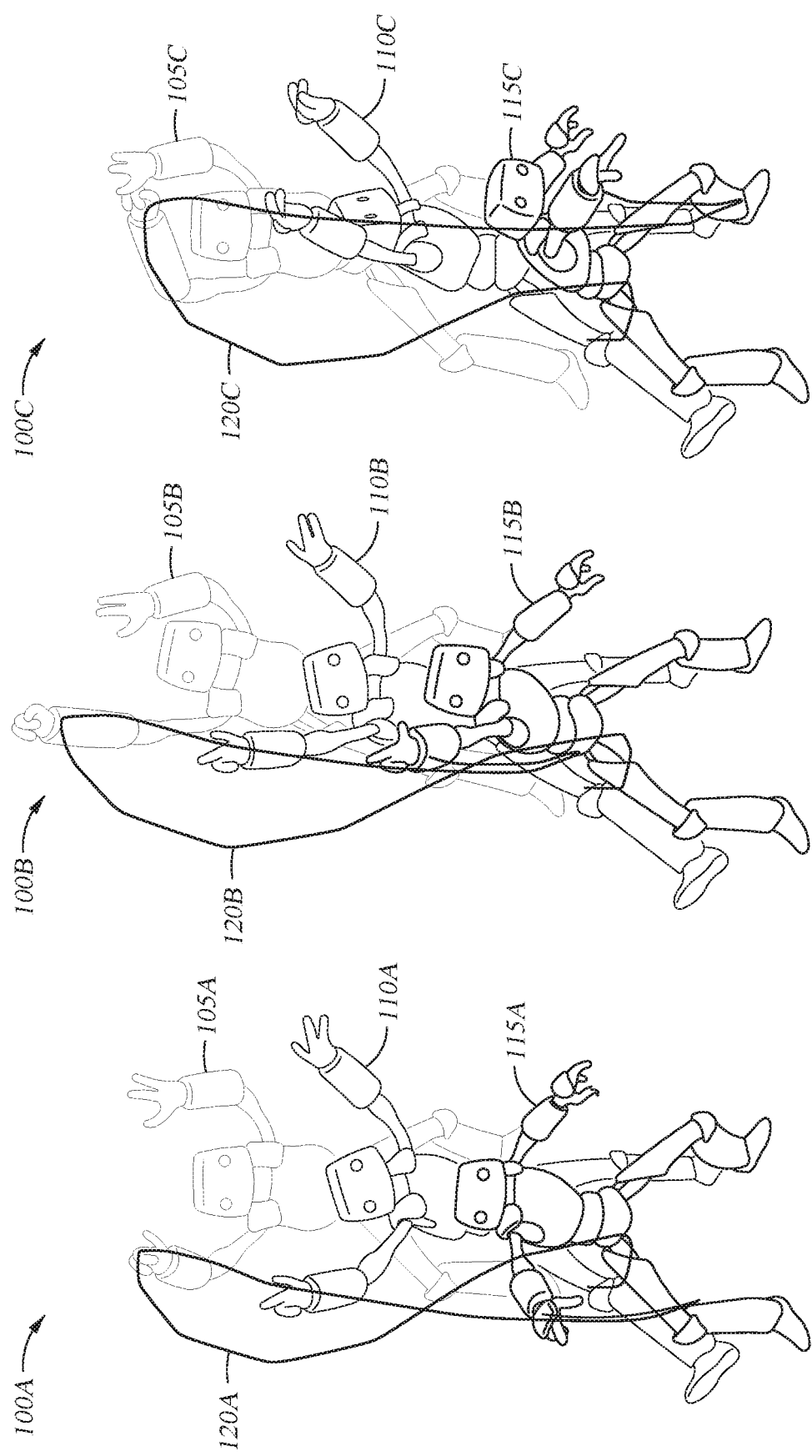
FIG. 1 depicts an original animation and several variations that can be generated using some embodiments of the present disclosure.

Embodiments of the present disclosure generally provide techniques for parameterized animation that can significantly expedite the animation pipeline, lead to higher-quality animations that align with artist intent, and allow for fast and computationally-efficient modifications of existing animations. In embodiments, character animation editing methods are provided that accommodate animation changes while preserving the animator's original artistic intent. This can give the artist control over the automatic editing of animations by extending them with artist-defined metadata. In one embodiment, a metadata representation is provided that describes the aspects of an animation that can be varied. To make the authoring process easier, some embodiments provide a graphical user interface (GUI) for specifying the metadata.

In one embodiment, the animation system extracts a collection of trajectories of effectors and/or objects for the animation. The trajectories can then be approximated and parameterized (e.g., with a series of cubic Bezier curves). Then, in such an embodiment, the animation system generates a set of high-level parameters for editing which are related to trajectory deformations. In some aspects, the possible deformations are those that preserve the fine structure of the original motion. From the trajectories, the animation system can then apply various inverse kinematics techniques to generate a new animation that conforms to the user's edits while preserving the overall character of the original.

In at least one embodiment of the present disclosure, the animation system introduces a new metadata representation that enables users to specify the important elements to retain in an animation while performing motion editing. The metadata can define common animation constraints, as well as the modifiable elements of the animation, that can be specified at specific frames. This metadata can be independent of the animation technique used to generate the original motion. In some embodiments, elements of the animation that can be editable or modifiable include effectors and objects. Generally, an effector is a part of a character (e.g., a hand, arm, elbow, foot, head, and the like), while an object is a thing in the animated scene (e.g., a teapot, a ball, and the like).

In some embodiments, the metadata can specify, at any given frame of the animation, the set of elements (e.g., effectors and objects) that can be modified. For example, for a pointing animation, the metadata may specify that at the final frame of the animation, the location of the pointing hand can be changed (such that the character points in a different direction at the end of the animation). In such an embodiment, after the animation is created, the final position of the pointing hand can be changed. The animation system can then revise the entire animation such that the character points in the new direction, while maintaining the original style and intent of the artist that designed the original pointing animation.

Additionally, in some embodiments, the metadata can specify which global modifications are enabled, such as moving an object (e.g., placing a teapot further away from the character than it was in the original animation), replacing an object, rotating an object, changing the scale of the object, and the like. Suppose an animation exists where a character picks up a teapot and pours a cup of tea. In such an embodiment, the animation system can enable a user to move the teapot to a different location, change the teapot model, rotate the teapot, and the like. The animation is then automatically revised to reflect the updated position of the teapot.

In an embodiment, the animation system evaluates the metadata to identify modifiable (also referred to as parameterizable and/or editable) elements (e.g., end effectors and objects that can be modified, either globally across the entire animation or locally for specific frames). As used herein, an end effector refers to a part of a character (e.g., a hand, a foot, a leg, a head, and the like), while objects refer to any other scene elements (such as teapots, lamps, and the like). The animation system can then determine, for each frame of the animation, the state of each such element (e.g., the location, orientation, and/or trajectory). This yields a set of trajectories, one for each modifiable element, containing the state of each element at each frame of the animation.

In some embodiments, the animation system then approximates each trajectory by, for each trajectory, generating a set of curves approximating the trajectory between defined points along the trajectory. In at least one embodiment, the animation system uses animation events (e.g., defined in the metadata) as the break points in the trajectory. In such an embodiment, the user or artist can define animation events at one or more frames, using the metadata. The animation system can therefore identify the state (e.g., location) of each modifiable element at each such animation event. Curves can then be defined (e.g., Bezier curves) connecting the locations a given element at adjacent animation events. In embodiments, the curve parameters are refined such that the curve approximates the original trajectory. The collection of curves for a given element is referred to as a spline.

In an embodiment, the animation system can then construct a local coordinate system for each point on the spline. The points on the spline each correspond to a respective frame in the animation. In one embodiment, the animation system does so by first computing a coordinate system for each spline point that is on the original trajectory (e.g., the endpoints of each curve). The coordinate systems for the remaining spline points can then be computed by interpolation between the coordinate systems at each end point. Once a local coordinate system is defined for each spline point, the animation system can transform each trajectory point to the local coordinate system of the corresponding spline point (the point on the spline that corresponds to the same frame as the point on the trajectory).

In an embodiment, the animation system can then modify the spline (e.g., based on a user moving an object or an effector at one or more frames), re-calculate the coordinate system at each spline, and transform the local coordinate of each trajectory point with the corresponding local coordinate system of the associated spline point, in order to obtain new trajectory point positions. By indirectly modifying the trajectory (using spline modifications), the underlying artistic style and intent of the trajectory is maintained.

In embodiments, the animation system can then apply any number of inverse kinematic (IK) techniques and solvers to create a pose or set of poses for the animation that align with the new trajectories. In this way, the animation is updated to reflect the user modifications (e.g., moving the location of an effector and/or object), while maintaining stylistic choices. In some embodiments, the updated animations can be generated rapidly, such as in real-time or near real-time. This makes such embodiments well suited for dynamic use, such as in video games.

FIG. 1 depicts an original animation and several variations that can be generated using some embodiments of the present disclosure. In the illustrated embodiment, an original Animation 100A depicts a robot character leaping and pointing in a particular direction upon landing. Specifically, the original Animation 100A depicts the character at a First Position 105A in the air with both hands up, followed by a Second Position 110A where the character begins to fall and lower his arms, and a Third Position 115A where the character has landed, and is pointing down and to his right (towards the left of the page, as viewed in FIG. 1). Note that, for visual clarity, only three positions are illustrated for each animation: a first where the character is in mid-air at the height of its jump, a second where the character is beginning to fall, and a third where the character has landed. In embodiments, the Animation 100A may begin earlier (e.g., with the character standing on the ground prior to jumping).

Additionally, in the original Animation 100A, a Curve 120A illustrates the location of the character's right hand at various points in the Animation 100A. Note that in the illustrated embodiment, the Curve 120A depicts the character's hand beginning at the start of the Animation 100A (when the character is on the ground) through the end of the Animation 100A (when the character has landed again), although the only discrete positions depicted do not include the beginning of the jump. In the illustrated embodiment, the character's right hand is a modifiable element in the scene. Specifically, the accompanying metadata can indicate that the position of the character's right hand can be changed for the last frame of the Animation 100A, such that the character points in a different direction after the Animation 100A finishes. Embodiments of the present disclosure provide techniques that allow a user to reposition the character's hand for the final frame, and modify the Animation 100A to yield new Animations 100B and 100C (or any number of other modifications) that preserve the artistic personality of the original Animation 100A.

Based on the original Animation 100A, the accompanying metadata, and/or an updated position, an animation system described in embodiments of the present disclosure creates a new Animation 100B. In the Animation 100B, the user has repositioned the character's right hand to the updated position (i.e., pointing upwards and to the right in the example of FIG. 1). The Animation 100B may include a First Position 105B, a Second Position 110B, and a Third Position 115B. As illustrated, at the First Position 105B of the Animation 100B, the character's right hand is relatively higher than it was at the First Position 105A of the original Animation 100A. Similarly, at the Second Position 110B of the Animation 100B, the modified end effector is also higher than in the Second Position 100A of the original Animation 100A. Finally, at the Third Position 115B of the Animation 100B, the hand is located in the updated position provided by the user. The entire trajectory of the hand in the Animation 100B can be visualized by the Curve 120B.

Based on the original Animation 100A, the accompanying metadata, and/or the updated position, the animation system described in embodiments of the present disclosure can create a new Animation 100C. In the second modified Animation 100C, the user has repositioned the character's right hand to point to the left of the character for the final frame. The Animation 100C may include a First Position 105C, a Second Position 110C, and a Third Position 115C. As illustrated, at the First Position 105C of the Animation 100C, the character's right hand is relatively further to the left than it was at the First Position 105A of the original Animation 100A. Similarly, at the Second Position 110C of the Animation 100C, the modified end effector is further still towards the left, as compared to the original Animation 100A. Finally, at the Third Position 115C, the hand is located in the updated position provided by the user. The entire trajectory of the hand in the Animation 100C can be visualized by the Curve 120C.

Notably, as can be seen in the depicted Animations 100B100C, embodiments of the present disclosure have maintained the artistic intent of the original Animation 100A. That is, the modified Animations 100B and 100C reflect the same overall "look and feel" of the original Animation 100A, and preserve the personality of the character. Additionally, embodiments of the present disclosure enable these modified Animations 100B and 100C to be created without requiring extensive artistic effort. That is, the user need only reposition the character's hand to point in the desired direction, and need not manually re-animate the entire sequence or reposition the hand (or any other elements) for any other frames in the animation.

In the illustrated embodiment, the character's head orientation is further designated as a modifiable element (in this case, a modifiable end effector, as opposed to a modifiable object), in that the head orientation can be changed to look towards the direction the hand is pointing. In one embodiment, this is defined using a "look at" constraint, indicating that the head should be oriented to look in the same direction of the designated element (here, the right hand of the character).

Additionally, as depicted in the illustrated Animations 100A-100C, the other elements of the animation (e.g., the rest of the character, such as the left hand, both feet, and the like) remain unmodified in the Animations 100A-100C, other than to accommodate the updated position(s) of the modified effector. That is, the remaining elements (those not labeled as modifiable) are not directly changeable by the user. Instead, their states (e.g., positions, orientations, and/or scales) remain unchanged from the original animation, except as a consequence of the changed states of the modifiable elements (e.g., to ensure the character's hand remains attached to his body). In at least one embodiment, the system utilizes position solvers, such as an inverse kinematic (IK) solver, to obtain the pose at each frame, given a set of constraints on the form of joint positions and rotations. That is, given the constraints of the character regarding joints and rotation capabilities, as well as the updated pointing position, the system may modify other elements of the character to provide the desired position of the right hand. This modification is entirely automated, and does not require user-intervention.

Figure 2:
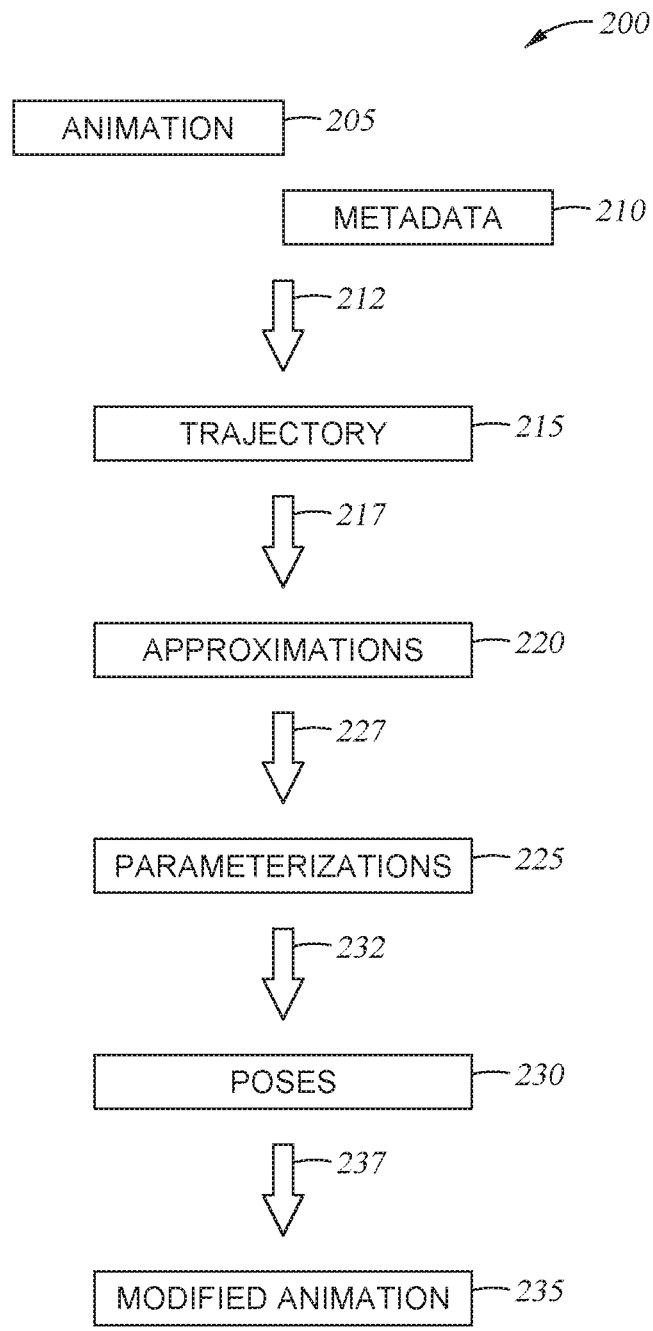
FIG. 2 depicts a workflow for evaluating animations and metadata to generate modified animations, according to one embodiment disclosed herein.

FIG. 2 depicts a workflow 200 for evaluating animations and metadata to generate modified animations, according to one embodiment disclosed herein. The workflow 200 can be performed by an animation system described herein. In the illustrated workflow 200, an original Animation 205 is received, along with accompanying Metadata 210. In one embodiment, the Animation 205 is created by an animator or artist. In various embodiments, the Animation 205 may include a two-dimensional scene or a three-dimensional scene. The Animation 205 generally includes a set of frames, where each frame includes zero or more elements, such as objects and characters (as well as individual effectors or portions of a character, such as feet and hands). Additionally, each element is associated with a corresponding location, scale, and/or orientation for each frame.

For example, the Animation 205 may include positions, orientations, and/or scales for a plurality of elements at a plurality of points in time (defined as frames in the animation). In one embodiment, animators can manually define the positions, orientations, and/or scale of one or more elements at any frame in the animation. In some embodiments, animators can use key frames to specify the locations, orientations, and/or scale of the elements at specific points in the Animation 205, and allow the computer to interpolate between the key frames.

In the illustrated embodiment, the Metadata 210 can define any aspects of the animation, including animation constraints, modifiable elements, allowable modifications, frames where modifications can be made, and the like. In some embodiments, the animator(s) can create the Metadata 210 while building or after finishing the Animation 205, in order to define the allowable modifications. In some embodiments, the Metadata 210 allows the animator to specify categories of editable elements (such as objects and effectors). In one embodiment, the potentially editable/modifiable effectors include the pelvis, one or more shoulders, one or more thighs, one or more hands, and one or more feet of each character. In some embodiments, the animator can further specify constraints in the Metadata 210, including between objects and/or effectors, as well as look-at constraints. The Metadata 210 can be used to identify, for each frame, the set of editable elements and the types of edits that are possible. One example Metadata 210 is provided below in Example 1. Note that the example provided in Example 1 includes descriptive values for various objects and parameters, rather than actual values for each parameter.

```
{
  "objects":[
    {
      "objectName":"The object 's name",
      "offsetName":"The offset point from pivot , if any",
      "isModifiable": true,
      "isReplaceable": true
    },
    ...
  ],
  "effectors":[
    {
      "effectorName":"The end-effector 's name"
    },
    ...
  ],
  "events":[
    {
      "keyframe":0,
      "modifiableEffectors":[
        "The name of the first modifiable effector",
        "The name of the second modifiable effector",
        ...
      ],
      "constraints":[
        {
          "constrainedElement":"The constrained element 's name",
          "constrainingElement":"The constraining element 's name"
        },
        ...
      ],
      "lookAt":"The name of the element to look at"
    }
  ]
}
```

Example 1

Although one example of textual Metadata 210 is provided above, the Metadata 210 may take any suitable form. In some embodiments, the Metadata 210 is generated using a graphical user interface (GUI). For example, the GUI may depict the Animation 205, and allow the user to select each frame (or key frame). Then, for the selected frame(s), the user can select and designate the modifiable elements.

Once the Animation 205 and Metadata 210 have been created, they can be used to produce modified animations that preserve the original artistic intent. In the illustrated workflow 200, as depicted by Arrow 212, the Animation 205 and Metadata 210 are used to generate a set of Trajectories 215. That is, the Animation 205 is represented using as a set of spatiotemporal Trajectories 215. In one embodiment, the Trajectories 215 are only generated for the modifiable elements of the scene. In such an embodiment, generating the Trajectories 215 begins with identifying the modifiable elements in the Metadata 210, and iterating through each frame in the Animation 205. For each frame, the system can sample the state of each modifiable element (e.g., its position, orientation, and/or scale).

This sampled data provides the Trajectories 215 for each modifiable element, consisting of the element state at each frame. In some embodiments, the Trajectories 215 further include information about a look-at rule, such as the direction a given element should look, the weight to use, and the like. As used herein, the weight for a look-at rule of an element indicates the weight used to interpolate the position/orientation of the element between the original animation and the modified version. In the illustrated workflow, as depicted by Arrow 217, these Trajectories 215 are then used to generate Approximations 220, which allows the Trajectories 215 to be indirectly deformed, while preserving the fine structure of the motion.

In one embodiment, generating the Approximations 220 begins with splitting the Trajectories 215, where each Trajectory 215 is divided into a set of sub-trajectories based on the metadata events (e.g., defined by key frames). That is, the Trajectory 215 is divided into a set of sub-trajectories with the end of each sub-trajectory corresponding to a key frame in the Animation 205. Each sub-trajectory includes all of the trajectory points (e.g., the element states, which can include position, orientation, and/or scale) that are between consecutive events/key frames. In such an embodiment, each sub-trajectory therefore consists of a set of M data points ($M_0, \ldots, M_1, \ldots, M_{m-1}$). The system can then generate an Approximation 220 for the sub-trajectory by finding a curve (e.g., a cubic Bézier curve) where the first and last data points ($M_0$ and $M_{m-1}$) correspond to the curve endpoints, and the remaining points in the curve are selected such that the curve approximates the data polygon using least squares.

In one embodiment, to do so, the system first determines a set of parameters ($t_0, \ldots, t_1, t_{m-1}$) in the domain [0, 1] to fix the data points at particular values. Note that, in embodiments, there is one t parameter for each data point M. In embodiments, there are a wide variety of parameterization methods that can be utilized, such as a uniform method, a chord length method, a centripetal method, and the like, each with advantages and disadvantages. For cubic splines, the centripetal method has been shown to produce results that are sufficiently close to the original data points on the Trajectory 215. Once the parameters have been determined, in one embodiment, the system proceeds with the task of approximating the sub-trajectories with Bézier curves.

In some embodiments, the system specifically utilizes cubic Bézier curves, which are defined by four points <$P_0$, $P_1$, $P_2$, $P_3$>. As discussed above, the curve is generated to pass through the first and last data points, which gives $P_0=B(0)=M_0$ and $P_3=B(1)=M_{m-1}$. Therefore, there are only two unknowns, which are the control points $P_1$ and $P_2$. In an embodiment, therefore, the least squares error that the system seeks to minimize is defined using Equation 1 below.

$$f(P_1, P_2) = \sum_{j=1}^{m-2} |M_j - B(t_j)|^2 \quad \text{Equation 1}$$

In embodiments, the system attempts to find a pair of values, $P_1$ and $P_2$, that minimizes Equation 1. Solving this equation therefore gives the solutions $P_1=(A_1B_1-A_{12}C_2)/(A_1A_2-A_{12}^2)$ and $P_2=(A_1B_2-A_{12}C_1)/(A_1A_2-A_{12}^2)$, where:

$$A_1 = 9\sum_{j=0}^{m-2} t_j^2(1-t_j)^4$$

$$A_2 = 9\sum_{j=0}^{m-2} t_j^4(1-t_j)^2$$

$$A_{12} = 9\sum_{j=0}^{m-2} t_j^3(1-t_j)^3$$

-continued $$B_1 = \sum_{j=0}^{m-2} 3t_j(1-t_j)^2[p_j - (1-t_j)M_0 - t_j^3 M_{m-1}]$$

$$B_2 = \sum_{j=0}^{m-2} 3t_j^2(1-t_j)[p_j - (1-t_j)M_0 - t_j^3 M_{m-1}]$$

Using these equations, the system can approximate each sub-trajectory using a Bézier curve, and join these approximations end-to-end to form a point-wise continuous Bézier spline, which serves as the Approximation 220 for the Trajectory 215 of a given element.

In the illustrated workflow, as depicted by Arrow 227, these Approximations 220 are then utilized to generate Parameterizations 225. In an embodiment, the Parameterizations 225 are modified Trajectories 215, created using the Approximations 220. As discussed above, in some embodiments, each animation Trajectory 215 is approximated by a series of Bézier curves that are connected end-to-end to form a Bézier spline. In an embodiment, the curve parameters t play a significant role in the trajectory deformation used to create modified animations. The curve parameters can be used to calculate the matching curve point to any given trajectory point by simply evaluating the curve function at the corresponding curve parameter. In embodiments, this allows the system to identify a way of parameterizing the trajectory points with respect to their corresponding curve in the spline. The modification process can then be accomplished by applying the desired adjustments to the spline, rather than directly to the trajectory.

In one embodiment, the system adopts and modifies a method of curve skeleton skinning to suit the problem of trajectory parameterization. Curve skeleton skinning has traditionally been used to generate realistic skin deformations by representing the relationship between the movement of the skeleton and skin deformation in a non-linear continuous fashion. In embodiments of the present disclosure, this approach can be used to generate deformations on the animation trajectories from local transformations of the Bézier curve points. The deformed trajectories preserve the original structure of the motion thereby preserving the artistic intent.

In an embodiment, the creation of the Parameterizations 225 begins with constructing a complete coordinate-system around each spline point. As discussed above, the curves that form each spline are defined by four parameters <$P_0$, $P_1$, $P_2$, $P_3$>, where $P_0$ and $P_3$ correspond to points in the original Trajectory 215. Following this, in embodiments, a coordinate system can be constructed in three steps detailed below.

In a first step, the system computes the coordinate-system of the spline points that are associated with data points in the original trajectory. The spline is composed by a set of N−1 curves (for N metadata events/key frames), $(B(t)_0, \ldots, B(t)_k, \ldots, B(t)_{n-2})$, each with two endings $P_0^k$ and $P_3^k$, which correspond to the points on the original trajectory. The coordinate-system at these points can be defined from the curve geometry given in Equation 2 below, where=(0, 0, 1), and where a, b, and c are vectors of the coordinate system.

$$a = \frac{\partial}{\partial t} B(t)_k$$ Equation 2

$$b = za$$

$$c = a\,b$$

In the second step, the system computes the coordinate-system of the rest of the spline points, which are the points inside the curve endings. In an embodiment, the coordinate-system at each of these points can be calculated by linear interpolation between the coordinate-systems at the curve endings computed above. Recall that in some embodiments, the system has a set of parameters t, each corresponding to a curve point. In an embodiment, therefore, the coordinate system for point t is given as: (a, b, c)=t($a_1$, $b_1$, $c_1$)+(1−t)($a_2$, $b_2$, $c_2$).

In a third step, the system further creates a 4×4 transformation matrix A by arranging the vectors of the coordinate-system as column vectors.

In some embodiments, once the system has defined a coordinate-system for each spline point, the system proceeds to transform each trajectory point $M_j$=(x, y, z) to the local coordinate-system $E_j$=(a, b, c, o). To do this, in one embodiment, the system utilizes the previously defined transformation matrix $A_j$.

In one embodiment, after the trajectory points are bound with the Bézier spline, the Trajectories 215 are deformed to complete the parameterization process. To do so, in one such embodiment, the system first modifies the spline (based on the user's edits or modifications, such as a new position for the character's hand) and re-calculates the coordinate-systems at each spline point. The system can then directly transform the local coordinates of each trajectory point with the associated local coordinate-system, in order to obtain the new trajectory positions. In some embodiments, the system only allows modifications to points shared between the spline and the trajectory. Additionally, to ensure the preservation of $C^1$ continuity, in some embodiments, the tangents between the points are maintained during the deformation process.

In the illustrated workflow 200, as depicted by Arrow 232, given the Parameterizations 225 (which represent modified Trajectories 215 for the updated animation), the system generates a series of Poses 230 to complete the animation. In an embodiment, as discussed above, each Trajectory 215 corresponds to a modified and/or modifiable element in the scene. In some embodiments, each Parameterization 225 corresponds to an element that was actually modified (e.g., given a new position, orientation, and/or scale in at least one frame). To yield an animation that meets the requirements provided in both the metadata and our new trajectories (the Parameterizations 225 and/or Trajectories 215), the system performs pose finding. In the case of objects, at each frame, the desired positioning is already encoded in the new trajectory of the object.

The placement of effectors, however, can be a more complicated issue because moving an effector can affect the whole body of the character. In some embodiments, the system applies a full body IK solver to find a pose for the character in which its parameterizable effectors are in the desired trajectory positions. At each trajectory point, therefore, the system can iterate through the state of all the parameterizable elements and use them as input for the IK solver. In some embodiments, the system makes an additional call to the solver to satisfy the look-at constraint(s).

After repeating this process for each trajectory point, the system has generated a set of poses in which the modifiable effectors are placed as desired, and the character is either looking at a specific position or in the process of doing so. As illustrated by Arrow 237, the poses and object states can then be assembled in their proper consecutive order to generate the new Modified Animation 235.

Figure 3:
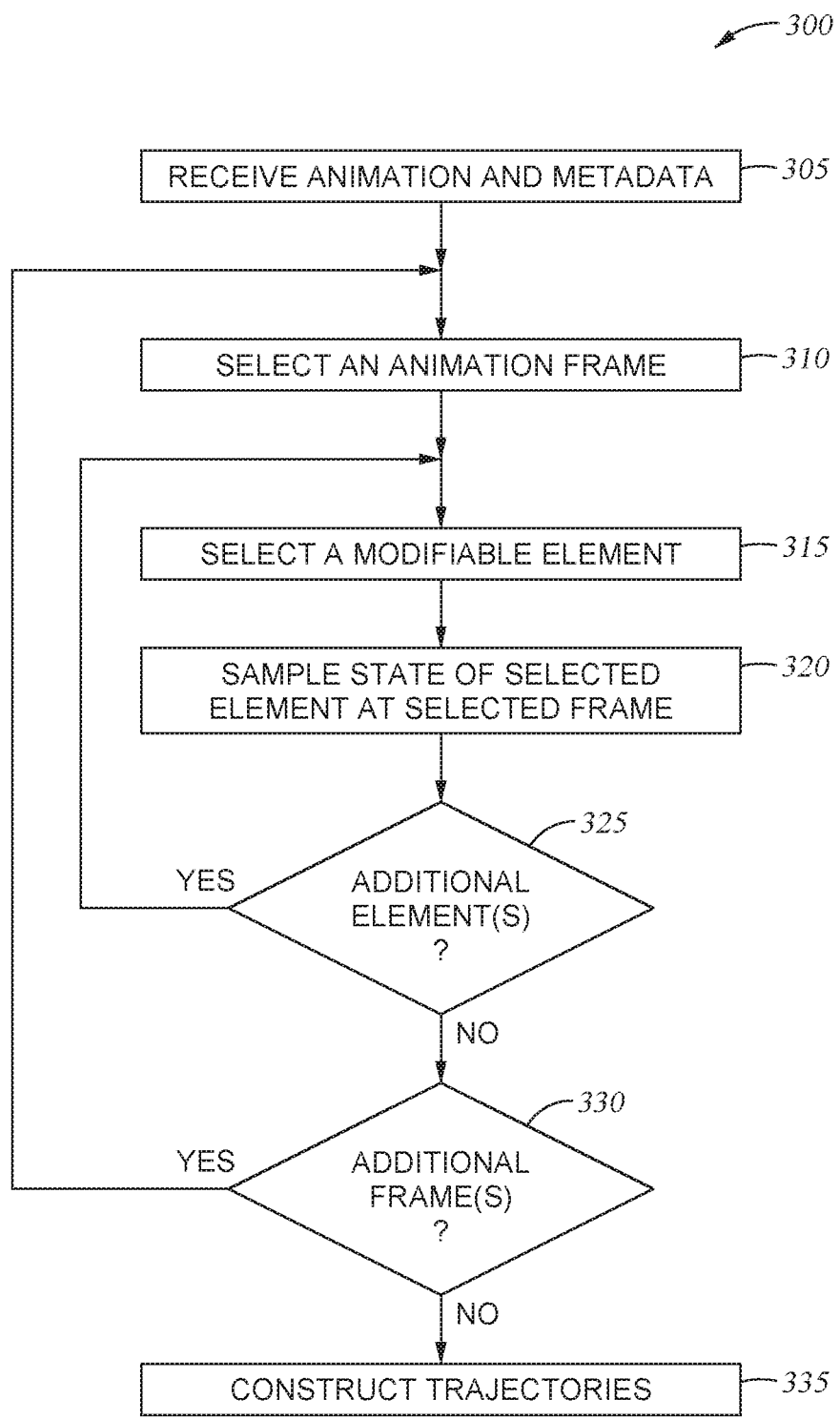
FIG. 3 is a flow diagram illustrating a method for constructing trajectories based on animations and metadata, according to one embodiment disclosed herein.

FIG. 3 is a flow diagram illustrating a method 300 for constructing trajectories based on animations and metadata, according to one embodiment disclosed herein. In an embodiment, the method 300 provides detail for the process represented by Arrow 212 in FIG. 2. The method 300 begins at block 305, where the animation system receives animation data and metadata. As discussed above, the animation generally includes a set of elements and a state of each element at each of a plurality of frames. The metadata includes information about the modifiable elements in a given frame, the applicable constraints, and the like. In some embodiments, the animation and metadata are created by artists or animators. Using embodiments of the present disclosure, subsequent modification(s) can be made to the animations using significantly less resources and time than is required to create the initial animation. In embodiments, a modification to an element generally corresponds to changing the state of the element at one or more frames in the animation. In various embodiments, the changed/updated state can include a new position/location of the element, a new orientation of the element, a new scale of the element (e.g., changing the size of the element), replacing the element entirely (e.g., replacing a teapot with an oil can), and the like.

At block 310, the animation system selects a frame in the animation that has not yet been sampled to create trajectories. In some embodiments, the animation system selects a frame beginning with the first frame, and iteratively selects each subsequent frame in subsequent iterations. The method 300 then continues to block 315, where the animation system selects one of the modifiable elements in the scene, as defined in the metadata. Modifiable elements are generally elements of the scene that a user (e.g., the animator) has labeled as elements that can be modified (e.g., move to a new position) without destroying the intent of the animation. At block 320, the animation system then samples the state of the selected element in the selected animation frame. In an embodiment, the state of the element includes the position of the element, the orientation of the element, and/or the scale of the element.

The method 300 then continues to block 325, where the animation system determines whether there is at least one additional modifiable element yet to be sampled for the selected frame. If so, the method 300 returns to block 315 to select the next modifiable element. In this way, the animation system iteratively evaluates each modifiable element in the selected frame. If all modifiable elements have had their state sampled in the selected frame, the method 300 continues to block 330, where the animation system determines whether there is at least one additional frame in the animation that has not yet been sampled. If so, the method 300 returns to block 310 to select the next frame. Otherwise, the method 300 continues to block 335. In this way, the animation system iteratively evaluates each frame in the animation. At block 335, the animation system constructs and/or finalizes the set of trajectories (e.g., Trajectories 215) for the modifiable elements of the received animation, based on the sampled states in each frame. These trajectories can then be used to generate modified animations.

Figure 4:
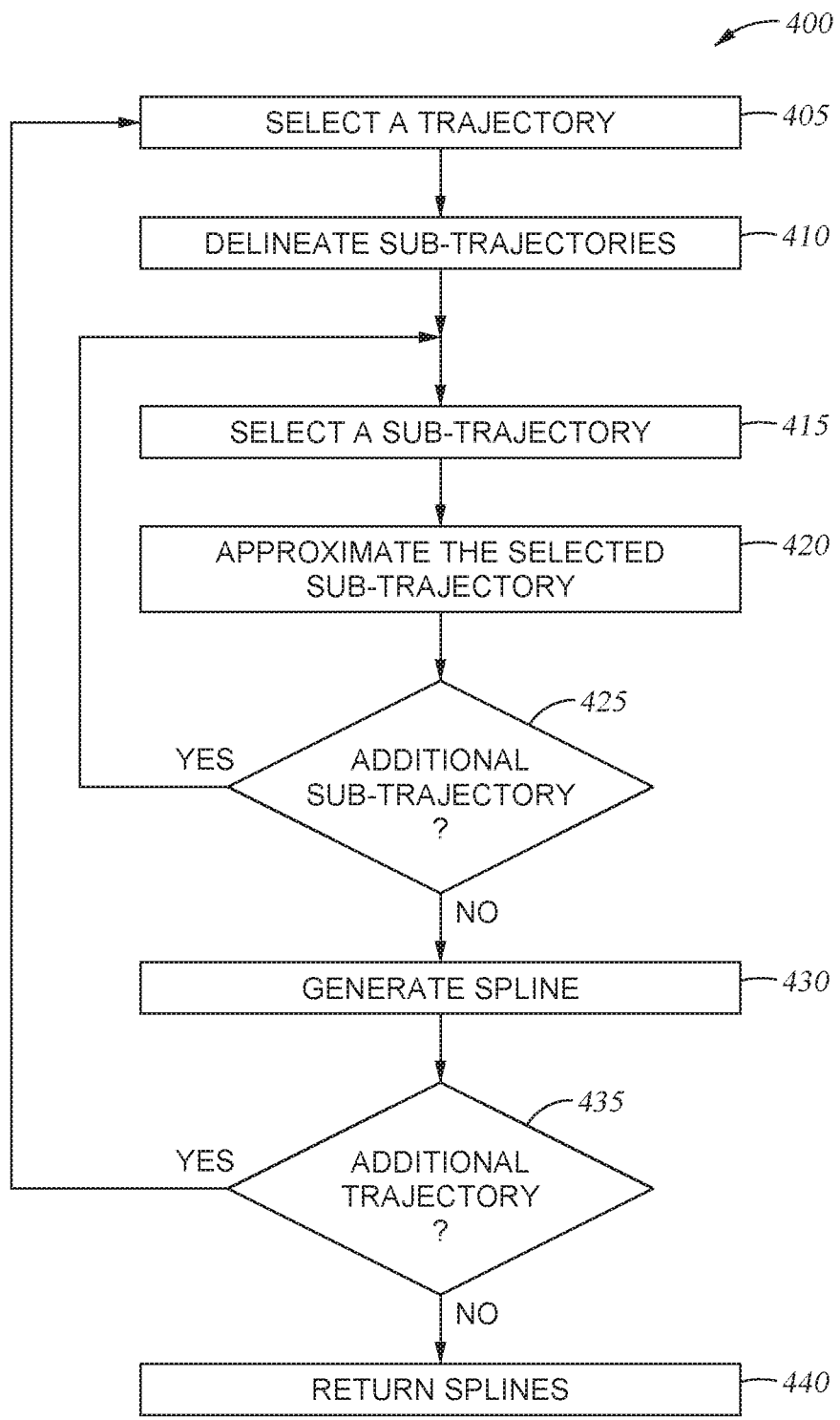
FIG. 4 is a flow diagram illustrating a method for approximating trajectories for an animation, according to one embodiment disclosed herein.

FIG. 4 is a flow diagram illustrating a method 400 for approximating trajectories for an animation, according to one embodiment disclosed herein. In an embodiment, the method 400 provides detail for the process represented by Arrow 217 in FIG. 2. The method 400 begins at block 405, where the animation system selects one of the generated trajectories. At block 410, the animation system delineates the selected trajectory into a set of sub-trajectories. In one embodiment, as discussed above, the animation system delineates the trajectory into sub-trajectories based on the events defined in the metadata, and/or based on key frames in the animation. In some embodiments, each event indicates an element state that was defined by the animator, while interim states may be accomplished through interpolation between defined events.

At block 415, the animation system selects one of the sub-trajectories defined for the selected trajectory, and at block 420, the animation system approximates the selected sub-trajectory. As discussed above, in some embodiments, generating the approximation includes finding or constructing a curve that approximates the sub-trajectory, with endpoints corresponding to the endpoints of the sub-trajectory. In one embodiment, the approximation is accomplished using cubic Bezier curves. Once the selected sub-trajectory has been approximated, the method 400 continues to block 425.

At block 425, the animation system determines whether there is at least one additional sub-trajectory, from the selected trajectory, that has not yet been approximated. If so, the method 400 returns to block 415. If all sub-trajectories in the selected trajectory have been processed, the method 400 proceeds instead to block 430. At block 430, the animation system generates a spline for the selected trajectory by joining the individual approximated curves end-to-end. This results in an approximation for the overall trajectory. The method 400 then continues to block 435, where the animation system determines whether there is at least one additional trajectory that has not yet been approximated. If so, the method 400 returns to block 405 to select the next trajectory. Otherwise, the method 400 continues to block 440, where the animation system stores and/or returns the generated splines that approximate the trajectories. As discussed above, in embodiments, the approximations allow the animation to be indirectly modified (without directly adjusting the trajectories), which helps preserve artistic intent.

Figure 5:
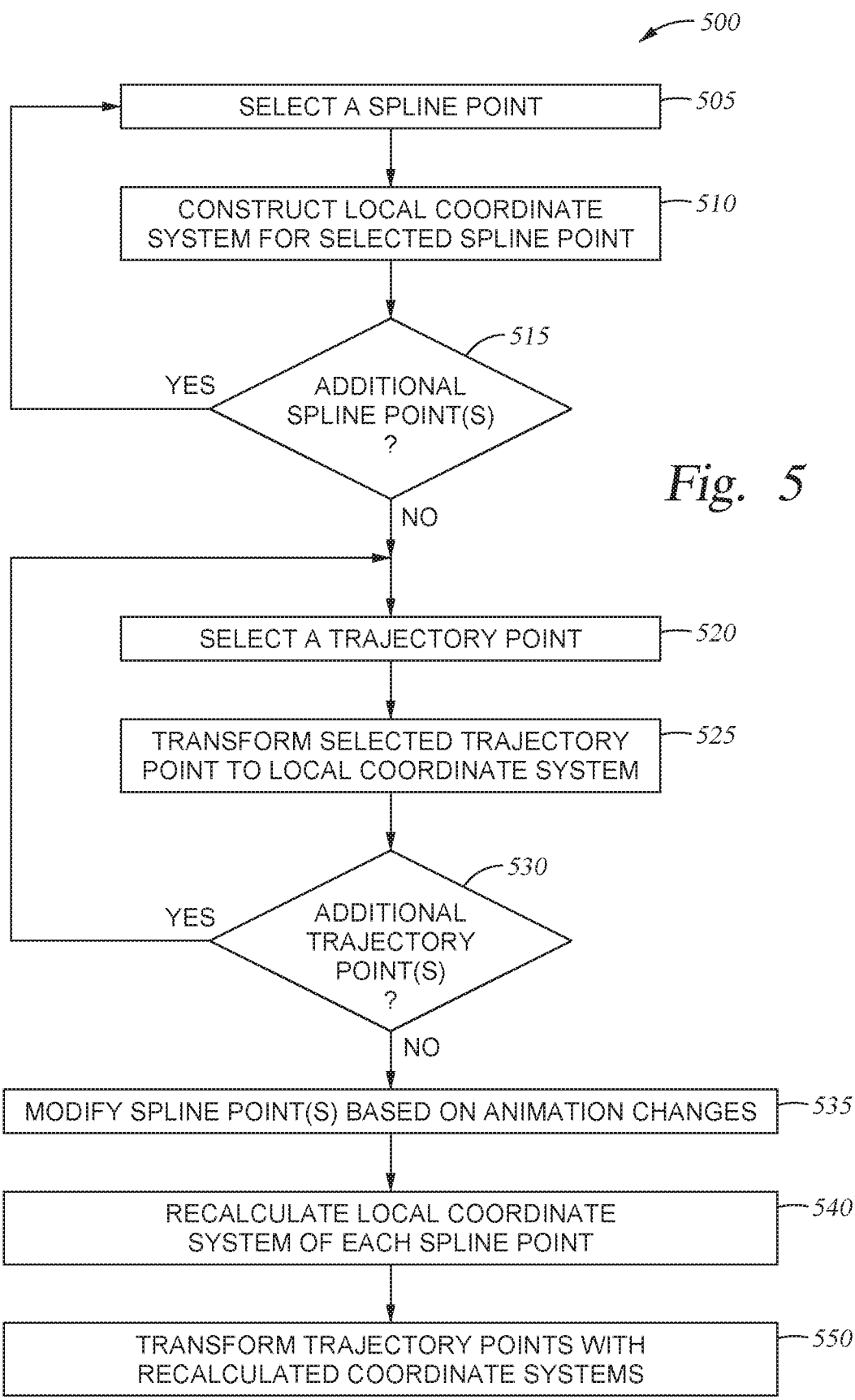
FIG. 5 is a flow diagram illustrating a method for modifying trajectories to yield altered animations, according to one embodiment disclosed herein.

FIG. 5 is a flow diagram illustrating a method 500 for modifying trajectories to yield altered animations, according to one embodiment disclosed herein. In an embodiment, the method 500 provides detail for the process represented by Arrow 227 in FIG. 2. In one embodiment, the method 500 is performed for each modified or modifiable element in the scene. That is, the method 500 can be repeated for each approximation (e.g., each spline) generated above. The method 500 begins at block 505, where the animation system selects one of the points on the generated (or selected) spline. In some embodiments, as discussed above, the animation system first selects and processes the spline points that correspond to data points on the original trajectory (e.g., the curve endpoints). The animation system can then process the remaining spline points based on those endpoints. After selecting a spline point, the method 500 continues to block 510.

At block 510, the animation system constructs a local coordinate system for the selected spline point. As discussed above, in one embodiment, if the selected point is associated with a data point in the original trajectory, the animation system generates the local coordinate system using the formulas given in Equation 2, above. If the selected spline point corresponds to an interim point, in one embodiment, the animation system uses linear interpolation between the coordinate systems of the adjacent curve endpoints to construct the coordinate system for the selected spline point.

After building the coordinate system for the selected spline point, the method 500 continues to block 515, where the animation system determines whether there is at least one additional spline point that has not yet been processed. If so, the method 500 returns to block 505 to select the next point. Otherwise, the method 500 continues to block 520. At block 520, the animation system selects one of the original trajectory points. At block 525, the animation system identifies the corresponding spline point, and transforms the selected trajectory point to the local coordinate system of the spline point. In some embodiments, the animation system does so using the transformation matrix described above.

The method 500 then continues to block 530, where the animation system determines whether there is at least one additional trajectory point yet-to-be processed. If so, the method 500 returns to block 520. Otherwise, the method 500 continues to block 535. At block 535, the animation system modifies one or more spline point(s) based on the animation changes made by the user. For example, if the user has repositioned an end effector for the final frame of the animation, the animation system can determine the updated spline point position(s). The method 500 then continues to block 540, where the animation system re-computes the coordinate systems for each modified spline point. In some embodiments, this utilizes a similar technique to the approach discussed above with reference to block 510.

At block 550, the animation system can then transform the coordinates of each affected trajectory point with the corresponding re-computed local coordinate system of the spline point(s). This yields a set of new trajectory positions for the scene element, which define the movement of the element in the final modified animation.

Figure 6:
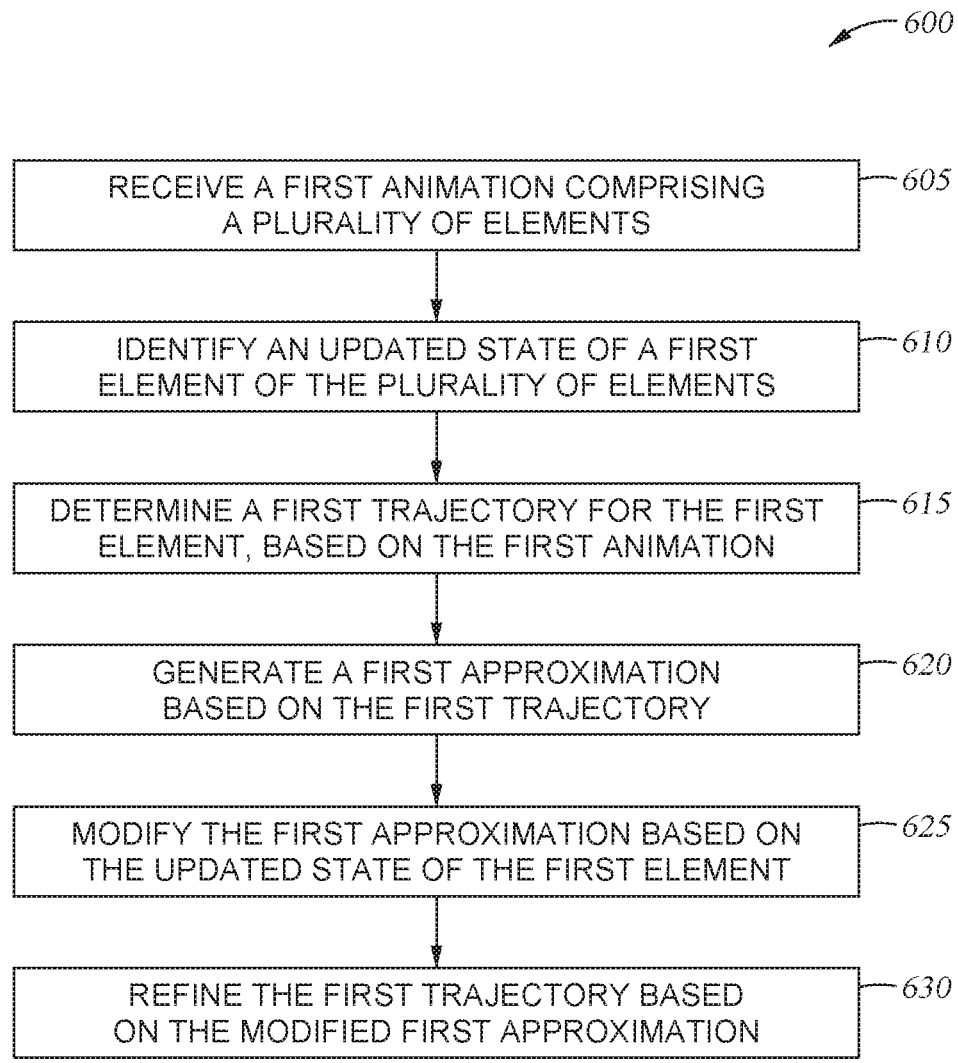
FIG. 6 is a flow diagram illustrating a method for modifying animations, according to one embodiment disclosed herein.

FIG. 6 is a flow diagram illustrating a method 600 for modifying animations, according to one embodiment disclosed herein. The method 600 begins at block 605, where an animation system receives a first animation comprising a plurality of elements. At block 610, the animation system identifies an updated state (e.g., a new position) of a first element of the plurality of elements. Additionally, at block 615, the animation system determines a first trajectory for the first element, based on the first animation. The method 600 then continues to block 620, where the animation system generates a first approximation based on the first trajectory. Further, at block 625, the animation system modifies the first approximation based on the updated state of the first element. The method 600 then proceeds to block 630, where the animation system refines the first trajectory based on the modified first approximation.

Figure 7:
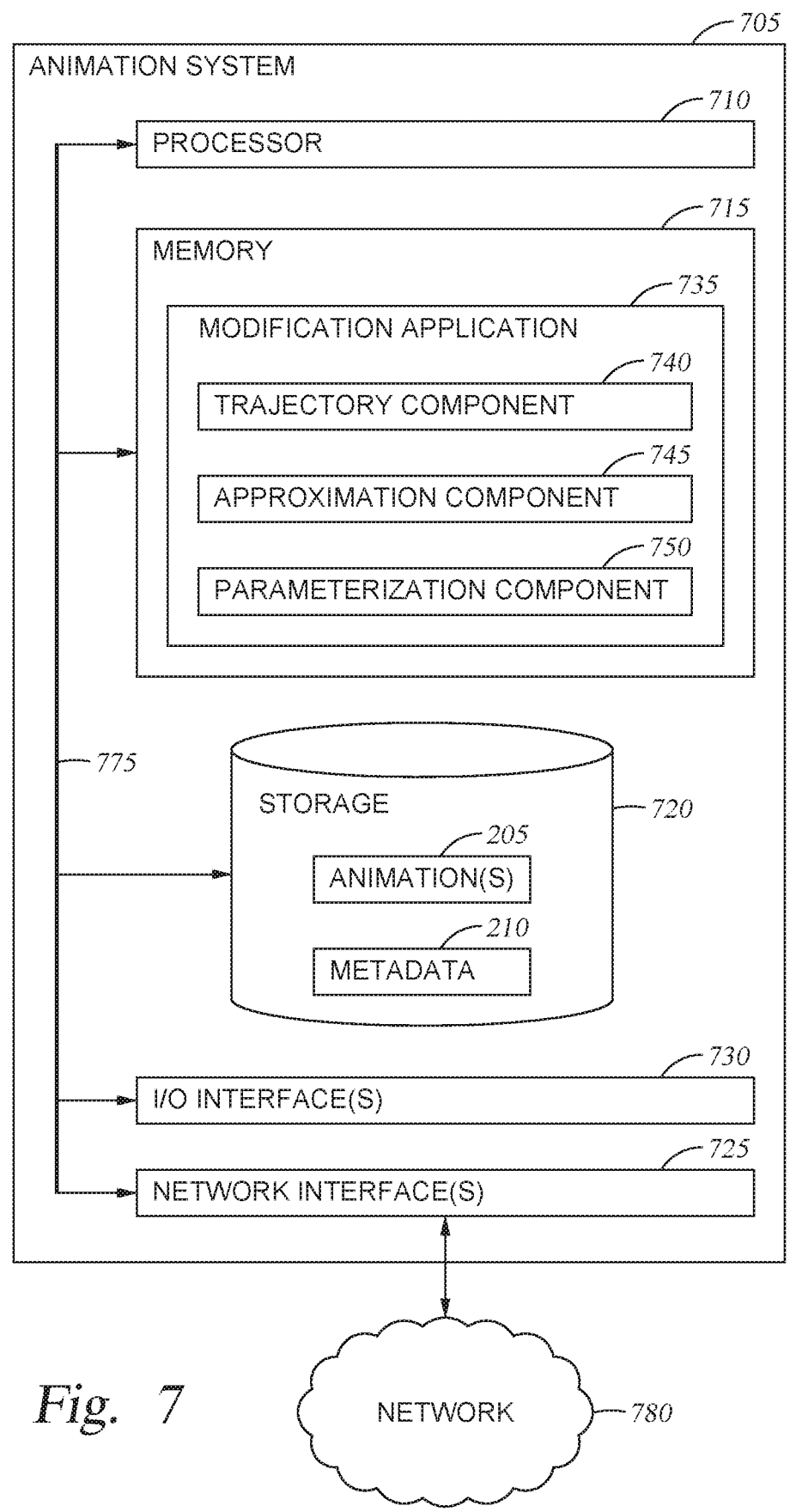
FIG. 7 is a block diagram of an animation system configured to modify animations, according to one embodiment disclosed herein.

FIG. 7 is a block diagram of an Animation System 705 configured to modify animations, according to one embodiment disclosed herein. Although depicted as a physical device, in embodiments, the Animation System 705 may be implemented as a virtual device or service, and/or across a number of devices (e.g., in a cloud environment). As illustrated, the Animation System 705 includes a Processor 710, Memory 715, Storage 720, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU and/or GPU, multiple CPUs and/or GPUs, a single CPU and/or GPU having multiple processing cores, and the like. The Memory 715 is generally included to be representative of a random access memory. Storage 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 730. Further, via the Network Interface 725, the Animation System 705 can be communicatively coupled with one or more other devices and components (e.g., via the Network 780, which may include the Internet, local network(s), and the like). Additionally, the Network 780 may include wired connections, wireless connections, or a combination of wired and wireless connections. As illustrated, the Processor 710, Memory 715, Storage 720, Network Interface(s) 725, and I/O Interface(s) 730 are communicatively coupled by one or more Buses 775.

In the illustrated embodiment, the Storage 720 includes one or more Animations 205, and corresponding Metadata 210. In one embodiment, the Animations 205 include original animations (e.g., created by an animator). In some embodiments, the Animations 205 can also include modified or refined animations (e.g., created by the Animation System 705 using techniques described in the present disclosure). In an embodiment, each Animation 205 is associated with corresponding Metadata 210 describing the modifiable elements, relevant constraints, animation events, and the like. Although depicted as residing in Storage 720 of the Animation System 705, in embodiments, the Animations 205 and Metadata 210 can reside in any suitable location (e.g., in a cloud environment or remote location).

As illustrated, the Memory 715 includes a Modification Application 735. The Modification Application 735 is generally configured to process and modify Animations 205 using the accompanying Metadata 210 and the techniques described in the present disclosure. Although depicted as software residing in Memory 715, in embodiments, the functionality of the Modification Application 735 can be implemented using hardware, software, or a combination of hardware and software. In the illustrated embodiment, the Modification Application 735 includes a Trajectory Component 740, an Approximation Component 745, and a Parameterization Component 750. Although depicted as discrete components for conceptual clarity, in embodiments, the operations of the Trajectory Component 740, Approximation Component 745, and Parameterization Component 750 may be combined or distributed across any number of components.

The Trajectory Component 740 is generally configured to construct trajectories for modifiable elements in a received Animation 205. The Approximation Component 745 is configured to then generate curves to approximate these trajectories. The Parameterization Component 750 is configured to modify these approximations to yield new trajectories for the modifiable elements. In embodiments, these new trajectories are used to generate the new animation. In one embodiment, this includes using the position given by the trajectory for any given frame as the updated position for the element at that frame. In at least one embodiment, this includes applying one or more IK solvers to the updated position(s) to generate an animation. Advantageously, these new animations can allow for dynamic and rapid (often in real-time or near real-time) modifications, while preserving artistic intent.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a first animation comprising a plurality of elements;
   identifying an updated state of a first element of the plurality of elements;
   determining a first trajectory for the first element, based on the first animation;
   generating a first approximation based on the first trajectory;
   modifying the first approximation based on the updated state of the first element; and refining the first trajectory based on the modified first approximation comprising:
  identifying, for a first trajectory point on the first trajectory, a corresponding point on the modified first approximation; and
  transforming the first trajectory point to a local coordinate system of the corresponding point on the modified first approximation.

2. The method of claim 1, further comprising receiving metadata for the first animation, wherein the metadata indicates a set of elements from the plurality of elements that are modifiable at each frame of a plurality of frames in the first animation.

3. The method of claim 1, further comprising generating a second animation based on the refined first trajectory.

4. The method of claim 1, wherein the updated state of the first element comprises at least one of:
  (i) a new location of the first element in one or more frames of a plurality of frames in the first animation;
  (ii) a new orientation of the first element in one or more frames of the plurality of frames;
  (iii) a new scale of the first element in one or more frames of the plurality of frames; or
  (iv) a new object to replace the first element in one or more frames of the plurality of frames.

5. The method of claim 1, wherein determining the first trajectory for the first element comprises determining at least one of (i) a location or (ii) an orientation of the first element at each frame, of a plurality of frames, in the first animation.

6. The method of claim 1, wherein generating the first approximation based on the first trajectory comprises generating a set of Bezier curves that collectively approximate the first trajectory.

7. The method of claim 6, wherein generating the set of Bezier curves comprises:
  dividing the first trajectory into a set of sub-trajectories based on predefined animation events in the first animation; and
  for each respective sub-trajectory:
    identifying a respective pair of points on the first trajectory;
    generating a respective Bezier curve having endpoints aligned with the respective pair of points; and
    finding parameters using least squares such that the respective Bezier curve approximates at least a portion of the first trajectory.

8. The method of claim 1, further comprising using the refined first trajectory as input to an inverse kinematic (IK) solver to generate a series of poses.

9. A non-transitory computer-readable medium containing computer program code that, when executed by operation of one or more computer processors, performs an operation comprising:
  receiving a first animation comprising a plurality of elements;
  identifying an updated state of a first element of the plurality of elements;
  determining a first trajectory for the first element, based on the first animation;
  generating a first approximation based on the first trajectory;
  modifying the first approximation based on the updated state of the first element; and
  refining the first trajectory based on the modified first approximation comprising:
    identifying, for a first trajectory point on the first trajectory, a corresponding point on the modified first approximation; and
    transforming the first trajectory point to a local coordinate system of the corresponding point on the modified first approximation.

10. The non-transitory computer-readable medium of claim 9, the operation further comprising receiving metadata for the first animation, wherein the metadata indicates a set of elements from the plurality of elements that are modifiable at each frame of a plurality of frames in the first animation.

11. The non-transitory computer-readable medium of claim 9, wherein the updated state of the first element comprises at least one of:
  (i) a new location of the first element in one or more frames of a plurality of frames in the first animation;
  (ii) a new orientation of the first element in one or more frames of the plurality of frames;
  (iii) a new scale of the first element in one or more frames of the plurality of frames; or
  (iv) a new object to replace the first element in one or more frames of the plurality of frames.

12. The non-transitory computer-readable medium of claim 9, wherein generating the first approximation based on the first trajectory comprises generating a set of Bezier curves that collectively approximate the first trajectory.

13. The non-transitory computer-readable medium of claim 12, wherein generating the set of Bezier curves comprises:
  dividing the first trajectory into a set of sub-trajectories based on predefined animation events in the first animation; and
  for each respective sub-trajectory:
    identifying a respective pair of points on the first trajectory;
    generating a respective Bezier curve having endpoints aligned with the respective pair of points; and
    finding parameters using least squares such that the respective Bezier curve approximates at least a portion of the first trajectory.

14. The non-transitory computer-readable medium of claim 9, the operation further comprising using the refined first trajectory as input to an inverse kinematic (IK) solver to generate a series of poses.

15. A system, comprising:
  one or more computer processors; and
  a memory containing a program which when executed by the one or more computer processors performs an operation, the operation comprising:
    receiving a first animation comprising a plurality of elements;
    identifying an updated state of a first element of the plurality of elements;
    determining a first trajectory for the first element, based on the first animation;
    generating a first approximation based on the first trajectory;
    modifying the first approximation based on the updated state of the first element; and
    refining the first trajectory based on the modified first approximation comprising:
      identifying, for a first trajectory point on the first trajectory, a corresponding point on the modified first approximation; and transforming the first trajectory point to a local coordinate system of the corresponding point on the modified first approximation.

16. The system of claim 15, the operation further comprising receiving metadata for the first animation, wherein the metadata indicates a set of elements from the plurality of elements that are modifiable at each frame of a plurality of frames in the first animation.

17. The system of claim 15, wherein the updated state of the first element comprises at least one of:
(i) a new location of the first element in one or more frames of a plurality of frames in the first animation;
(ii) a new orientation of the first element in one or more frames of the plurality of frames;
(iii) a new scale of the first element in one or more frames of the plurality of frames; or
(iv) a new object to replace the first element in one or more frames of the plurality of frames.

18. The system of claim 15, wherein generating the first approximation based on the first trajectory comprises generating a set of Bezier curves that collectively approximate the first trajectory.

19. The system of claim 18, wherein generating the set of Bezier curves comprises:
dividing the first trajectory into a set of sub-trajectories based on predefined animation events in the first animation; and
for each respective sub-trajectory:
identifying a respective pair of points on the first trajectory;
generating a respective Bezier curve having endpoints aligned with the respective pair of points; and
finding parameters using least squares such that the respective Bezier curve approximates at least a portion of the first trajectory.

20. The system of claim 15, the operation further comprising using the refined first trajectory as input to an inverse kinematic (IK) solver to generate a series of poses.

* * * * *